United States Patent [19]

Saito et al.

[11] 3,883,856

[45] May 13, 1975

[54] PROGRAM INPUT SYSTEM USING A MEMORY CASSETTE

[75] Inventors: Etsuro Saito, Atsugi; Shooichi Matsui, Yokohama, both of Japan

[73] Assignee: Sony Corporation, Tokyo, Japan

[22] Filed: Jan. 12, 1973

[21] Appl. No.: 323,254

[30] Foreign Application Priority Data

| | | |
|---|---|---|
| Jan. 31, 1972 | Japan | 47-13509[U] |
| Jan. 31, 1972 | Japan | 47-13510[U] |
| Jan. 31, 1972 | Japan | 47-13511[U] |

[52] U.S. Cl. .................. 340/173 SP; 235/61.11 A; 235/61.11 C

[51] Int. Cl. .... G11c 17/00; G06k 7/06; G06k 19/00

[58] Field of Search ..... 340/173 R, 173 SP; 200/46; 235/61.11 A, 61.11 C, 61.12 N, 61.12 C

[56] References Cited

UNITED STATES PATENTS

| | | | |
|---|---|---|---|
| 3,152,247 | 10/1964 | Brown | 200/46 |
| 3,200,240 | 8/1965 | Hammel | 235/61.11 |
| 3,514,754 | 5/1970 | Schwend | 200/46 |
| 3,653,006 | 3/1972 | Kohler et al. | 340/173 SP |
| 3,699,311 | 10/1972 | Dunbar | 340/173 SP |
| 3,702,464 | 11/1972 | Castrucci | 340/173 SP |
| 3,751,645 | 8/1973 | Brandsma et al. | 235/152 |

OTHER PUBLICATIONS

Heitzman, Chip; Read-Only Memory, IBM Technical Disclosure Bulletin, Vol. 8, No. 2, 7/65, pp. 333–334.

*Primary Examiner*—Stuart N. Hecker
*Attorney, Agent, or Firm*—Lewis H. Eslinger; Alvin Sinderbrand

[57] ABSTRACT

A program memory cassette containing a circuit board having electric program circuit elements thereon and a program input apparatus such, for example, as is provided in electronic calculators on which the cassette is placed and the circuit board is engaged with an electric contact device of the apparatus.

11 Claims, 12 Drawing Figures

PROGRAM INPUT SYSTEM USING A MEMORY CASSETTE

BACKGROUND OF THE INVENTION

This invention relates generally to a program input system, and more particularly to such a system in which a program memory is electrically connected with the input terminals of a program input apparatus on which the cassette is removably placed.

Conventional electronic calculators and the like employ several kinds of program memory devices such as, for example, perforated tapes, magnetic tapes, magnetic cards, etc.. In the art of program memory devices, the use of a diode matrix circuit or a resistor matrix circuit has become popular recently, particularly as program memory devices for electronic calculators. The reason for this is that the diode matrix circuit and the resistor matrix circuit are simple in construction and easy to manufacture. However, such conventional electronic calculators and the like, which employ the diode matrix or the resistor matrix circuits, are usually large in size and complicated in construction because they have to provide electric connection devices for a number of different programs which will be used for several purposes in the processes of different operations.

SUMMARY OF THE INVENTION

The above and other disadvantages are overcome by the present invention of a memory cassette comprising a housing formed by a top wall, a bottom wall and at least one side wall and a circuit board accommodated in the housing. The circuit board has memory circuit elements and electric contacts exposed outwardly through at least one opening provided through at least one wall of the housing. In one embodiment of the invention the memory circuit is a diode matrix circuit which in another embodiment of the invention the memory circuit is a resistor matrix circuit. A program input apparatus according to the invention is provided with a plurality of electric contacts to engage with the corresponding exposed electric contacts of the memory cassette. In the preferred embodiment these electric contacts of the program input apparatus are made of elastic conductive material at least at the point of contact with the corresponding electric contacts of the memory cassette. In one particular embodiment the contacts are comprised of a metal body provided with a hollow at its top and a conductive elastomer filled in the hollow and covering the top of the metal body. The hollow has a corrugated surface.

Accordingly, it is an object of the present invention to provide an improved program memory device for use with a program input apparatus.

It is a further object of the present invention to provide a compact program memory device of a cassette type for a program input device.

It is a still further object of the present invention to provide a simplified and reliable contact device in a program input apparatus to engage with the compact program memory device of a cassette type.

The foregoing and other objectives, features, and advantages of the invention will be more readily understood upon consideration of the following detailed description of certain preferred embodiments of the invention, taken in conjunction with the accompanying drawings.

DESCRIPTION OF THE PREFERRED EMBODIMENTS

Figure 1:
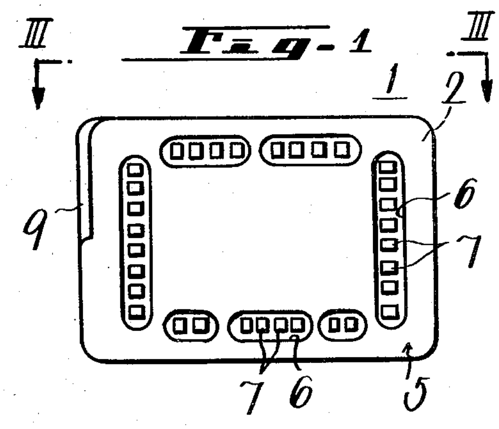
FIG. 1 is a plane view of a program memory cassette according to the present invention.
Figure 2:
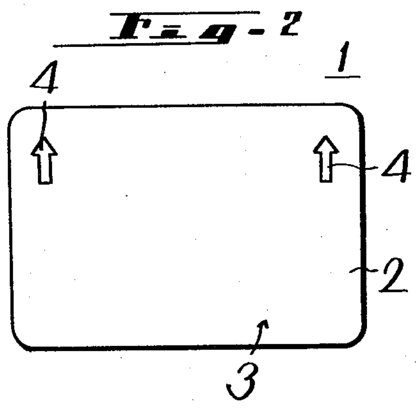
FIG. 2 is a bottom view of the program memory cassette shown in FIG. 1.
Figure 3:
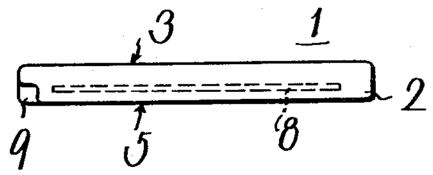
FIG. 3 is a front view of the program memory cassette taken generally along the line III—III in FIG. 1.

Referring now more particularly to FIGS. 1 to 3, the program memory cassette 1 of the invention has a flat housing 2 in which a program memory circuit such as, for example, a resistor matrix circuit, a diode matrix circuit or the like is accommodated.

An embodiment of a diode matrix circuit for use in the present invention will be now described with reference to FIG. 11. In the figure reference characters $l_1$, $l_2$, $l_3$, $l_4$ and $L_1$, $L_2$, $L_3$, $L_4$ represent column and row lead wires, respectively, $R_1$, $R_2$, $R_3$ and $R_4$ the resistors, $t_1$, $t_2$, $t_3$, $t_4$, $T_1$, $T_2$, $T_3$ and $T_4$ the terminals of the diode matrix circuit, respectively, $T_5$ an electric power source terminal, and D the diodes. In this embodiment, it is to be understood that the transistors $Tr_1$ to $Tr_8$, inclusive, are provided within an electronic calculator, computer or the like and an electric power source such, for example, as a DC electric power source E is also externally provided.

Separate diodes D are connected at their anodes to selected row leads $L_1$, $L_2$, $L_3$ or $L_4$ and at their cathodes to selected column leads $l_1$, $l_2$, $l_3$ and $l_4$. Thus some, but not necessarily all, of the row leads are interconnected through separate diodes with the column leads. The specific arrangement of the diode interconnections constitutes the "program" of the memory circuit.

The column leads $l_1$, $l_2$, $l_3$ and $l_4$ are separately connected through the resistors $R_1$, $R_2$, $R_3$ and $R_4$, respectively, to the positive terminal of the power source E at a contact $T_5$ and to the collectors of the NPN transistors $Tr_1$, $Tr_2$, $Tr_3$ and $Tr_4$, respectively, at the contacts $t_1$, $t_2$, $t_3$ and $t_4$, respectively.

The row leads $L_1$, $L_2$, $L_3$ and $L_4$ are separately connected to the bases of the PNP transistors $Tr_5$, $Tr_6$, $Tr_7$ and $Tr_8$, respectively, at the contacts $T_1$, $T_2$, $T_3$ and $T_4$, respectively. The emitters of the transistors $Tr_5$–$Tr_8$, inclusive, are connected to the positive terminal of the source E whereas the emitters of the NPN transistors $Tr_1$–$Tr_4$, inclusive, are connected to the negative terminal of the source E.

Outputs $O_1$, $O_2$, $O_3$ and $O_4$ are taken at the collectors of the transistors $Tr_5$, $Tr_6$, $Tr_7$ and $Tr_8$, respectively, which are suitably biased from the negative terminal of the source E. Inputs $I_1$, $I_2$, $I_3$ and $I_4$ are applied to the bases of transistors $Tr_1$, $Tr_2$, $Tr_3$ and $Tr_4$, respectively.

Figure 11:
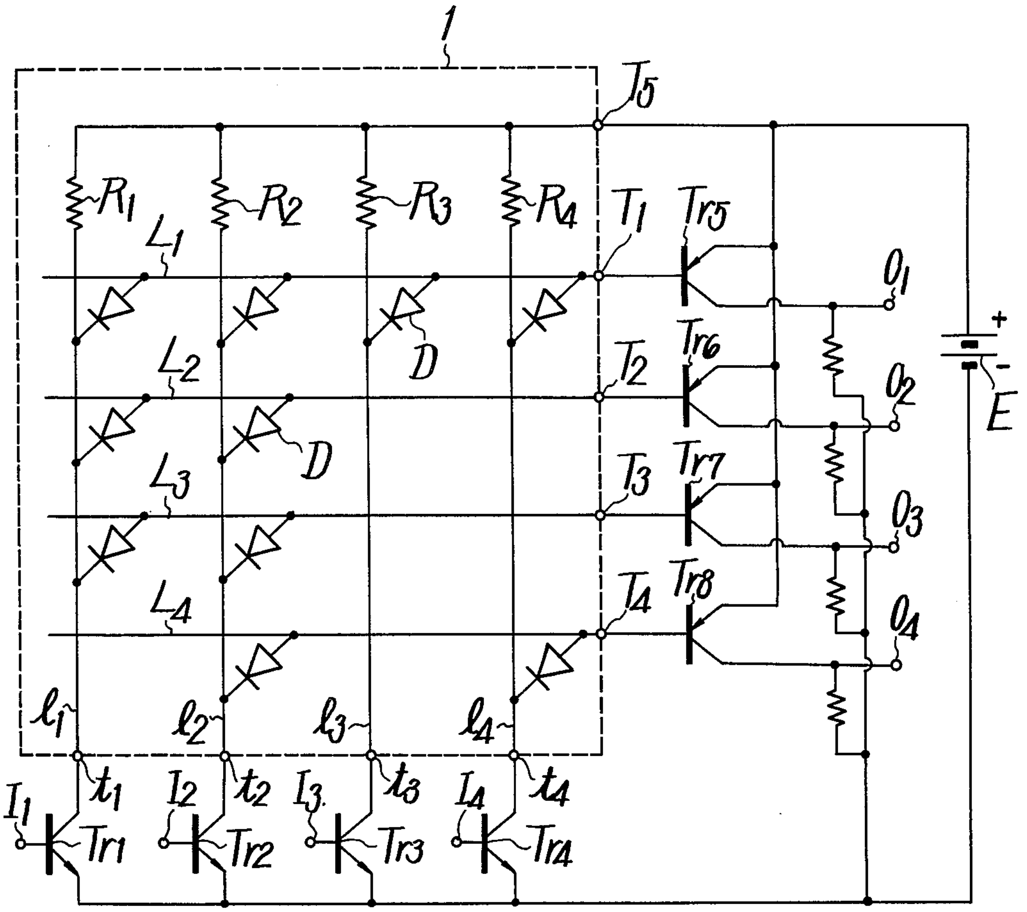
FIG. 11 is a schematic diagram of an example of a matrix circuit used in the present invention.

With the diode matrix circuit shown in FIG. 11, if a signal (which is a positive voltage in the illustrated example) is fed to a selected one of the input terminals $I_1$ to $I_4$, for example to the terminal $I_4$, the transistor $Tr_4$ is made conductive and the potential at the terminal $t_4$ becomes substantially an earth potential with the result that the diodes D connected to the lead $l_4$ are made conductive to make the transistors $Tr_5$ and $Tr_8$, in the illustrated example, conductive. Consequently, output signals are delivered to output terminals $O_1$ and $O_4$, respectively. When the outputs are derived from the output terminals $O_1$ and $O_4$, a code signal of 1001 is obtained. Such a circuit is well known in the art and from this circuit output signals of desired codes can be freely obtained with respect to the input signals to the input terminals $I_1$ to $I_4$ by changing the connection positions of the diodes D in the circuit.

It is possible to use resistors instead of the diodes D in the circuit shown in FIG. 11 in order to manufacture the matrix circuit at a low cost. In such a case, however, there is the danger that some of the transistors $Tr_5$ to $Tr_8$ are operated by leak currents when they should not be operated and deliver output signals with the result that error indications may occur. Such error indications may be avoided by carefully selecting the resistance values of the resistors in the position of the diodes D and those of the resistors $R_1$ to $R_4$. Such a circuit free from error indications is printed on a printed circuit board 8, to be described later herein, which is housed in the memory device 1.

Returning to FIGS. 1 to 3, reference numerals 4 designate arrows marked on an upper surface 3 of the housing 2. The cassette housing 2 is inserted in the calculator in the direction of the arrows 4. Through a lower surface 5 of the housing 2 there are provided openings or bores 6 through which the terminals 7, more specifically the terminals $t_1$ to $t_4$ and $T_1$ to $T_4$ (FIG. 11) of the program memory circuit contained in the housing 2 can be observed from the outside. In this case, the terminals 7 are mounted on an insulating base plate of the printed circuit board 8 which is disposed in the housing 2 as shown in FIG. 3 by dotted lines. The housing 2 has a keying groove 9 formed along either of the upper or lower, left or right side edges thereof (in the illustrated example along the left edge of the upper surface 5 as viewed in FIGS. 1 and 3).

Figure 8:
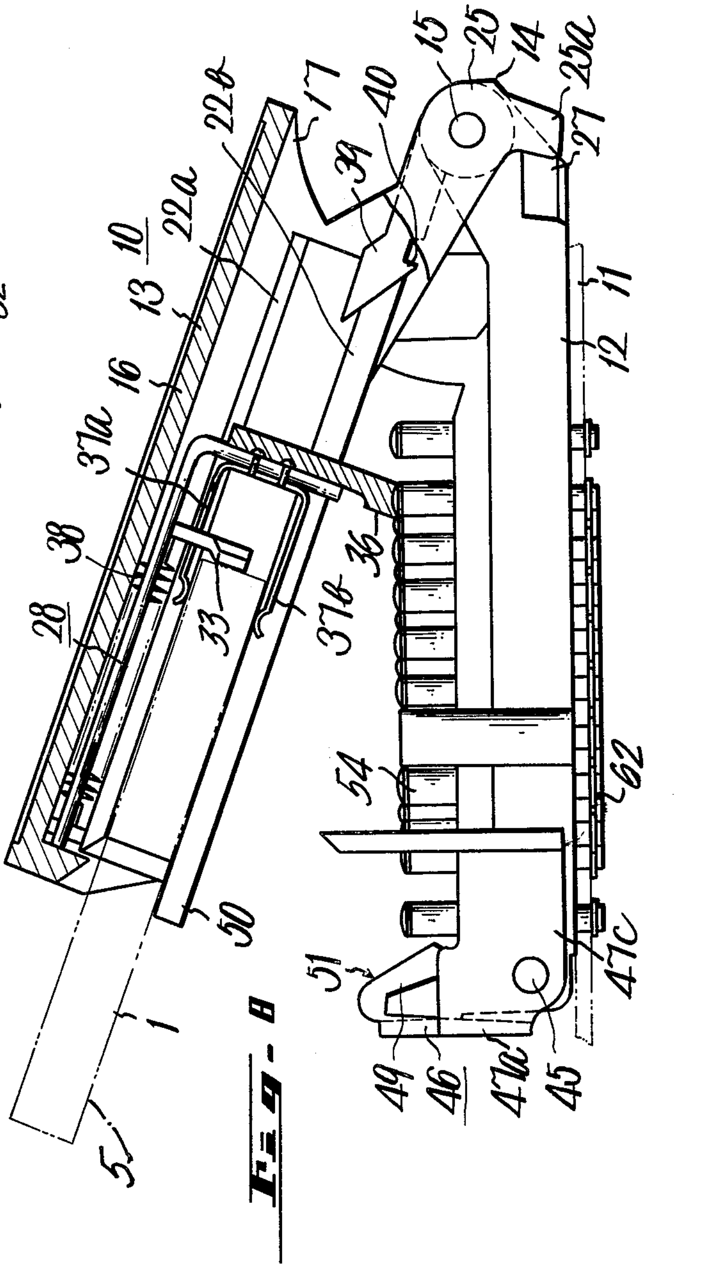
FIG. 8 is a cross-sectional view of the holder similar to that shown in FIG. 6 but in an open state.
Figure 6:
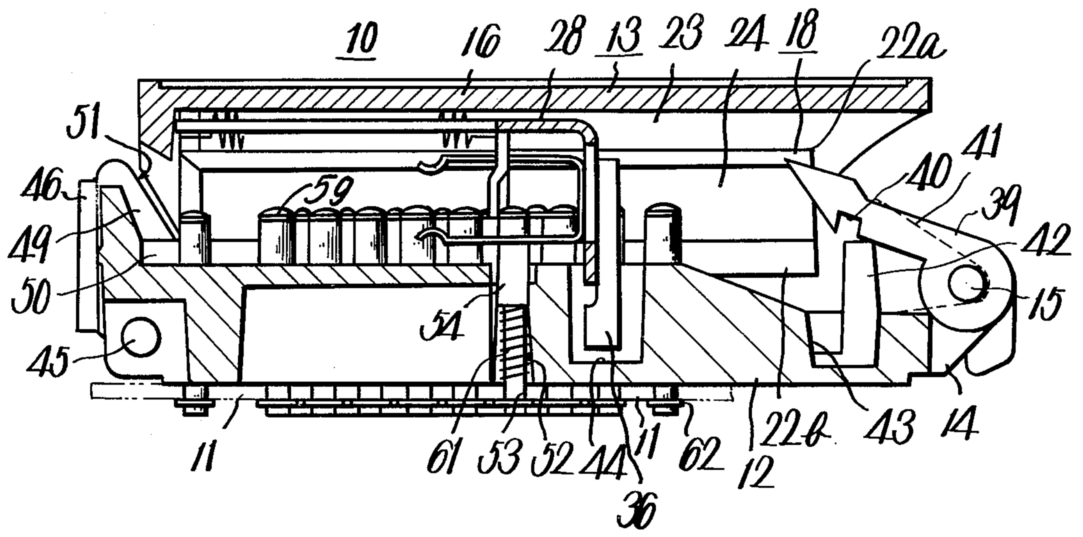
FIG. 6 is a cross-sectional view of the holder taken generally along the line VI—VI in FIG. 4.
Figure 7:
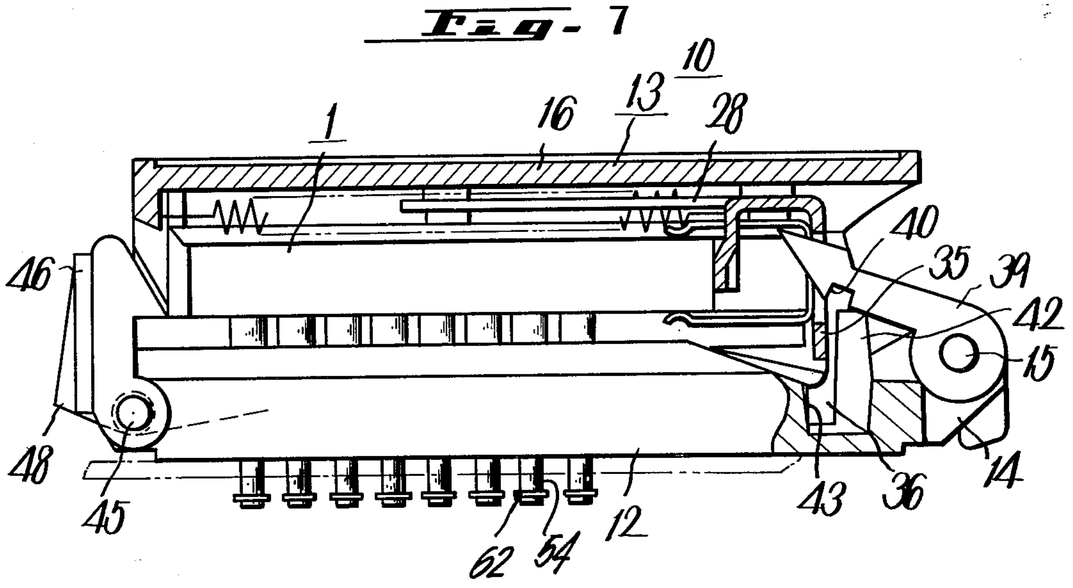
FIG. 7 is a cross-sectional view of the holder similar to that shown in FIG. 6 but different in the position of its parts.

A description will now be given of a mounting device or holder 10 for mounting the program memory cassette 1 with reference to FIGS. 4 to 9. In this case, the left and right sides of FIGS. 6 to 8 are referred to as the front and rear edges, respectively, for convenience of description. In the figures reference numeral 11 designates an insulating base plate of a printed circuit board for mounting the holder 10. The holder 10 includes a base plate member 12 made of insulating material which is fixed to the base plate 11 and a memory cassette holder 13. The plate member 12 has rearwardly extending lugs 14 at the left and right edges of the rear side thereof. A shaft 15 is supported by the lugs 14 therebetween.

The cassette holder 13 is provided with guides 18 (in FIG. 5) of substantially U-shaped cross-section. The guides 18 oppose an upper plate 16 and left and right side plates 17 at the inner surfaces of the plates 17. A plurality of projections 20 located on a center piece 19 of each guide 18 at a plurality of positions engage with openings 21 formed in the side plates 17 and are attached firmly therein by means of a bonding agent or the like. A first space 23 is formed between an upper first flange 22*a* of each guide 18 and the upper plate 16, while a second space 24 is formed between the first flange 22*a* of each guide 18 and a lower, second flange 22*b* of each guide 18. As will be explained in greater detail hereinafter, the space 23 receives the edges of a cassette carrier 28 (FIG. 9) and the space 24 receives the edges of the cassette housing 2.

Projections 25, which are formed by projecting rearwardly one part of the rear edge of the cassette holder 13, for example, parts of the rear edges of the left and right side plates 17, are rotatably supported by the shaft 15 (in FIG. 8). A series coil springs 26 are wound on the shaft 15 in such a manner that one of their ends engage with the base plate 12 and their other ends engage with the flange 22*b* of the cassette holder 13 under the lower surface thereof to rotatably bias the cassette holder 13 in the clockwise direction about the shaft 15 (as viewed in FIGS. 6 to 8). In this case, the rotation of the cassette holder 13 by the springs 26 is stopped by the abutment of a lower shoulder 25*a* of the projection 25 with a part 27 of the rear edge of the base plate 12 as shown in FIG. 8.

Figure 9:
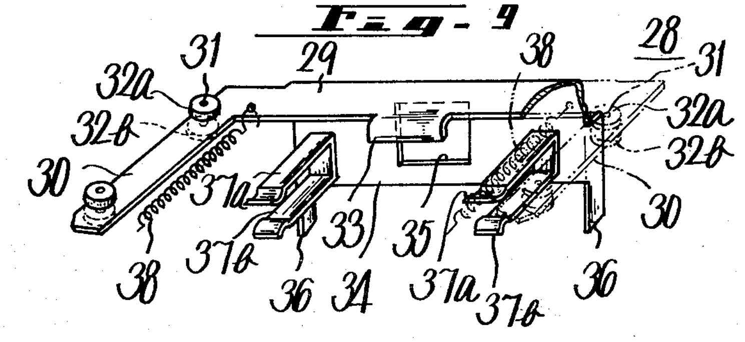
FIG. 9 is a perspective view of a carrier for the program memory cassette of FIG. 1.

The cassette holder 13 supports a cassette carrier or ejector 28 (FIG. 9) in such a manner that the latter can move or slide to the forward and rearward directions. As shown in FIG. 9, the cassette carrier 28 includes a central portion 29 and left and right plate portions 30. Shafts 31 are perpendicularly mounted on the upper and lower surfaces of the left and right pieces 30, respectively, and a pair of rubber rollers 32*a* and 32*b* are rotatably mounted above and below the surfaces, respectively, of the portions 30 on each of the shafts 31. The front edge of the central plate portion 29 is partially bent downwardly to form an abutment 33. The rear edge of the central plate portion 29 is also partially bent downwardly to form a stopper piece 34. A window 35 is formed in the stopper piece 34 and engaging members 36 are also formed by elongating the lower left and right edges of the stopper piece 34 downwardly. The engaging members 36 will be described in detail hereinafter in this specification. Two pairs of resilient upper and lower pieces 37*a* and 37*b* are attached to the stopper piece 34 at its left and right positions (as viewed in FIG. 9) to project forwardly, which pieces 37*a* and 37*b* act as U-shaped clips to hold the cassette 1 by gripping it therebetween from its lower and upper surfaces 3 and 5.

The cassette carrier is held captive in the holder 13 with the rollers 32*a* and 32*b* of the cassette carrier 28 being guided along the first space 23 of the cassette holder 13 so that the cassette carrier 28 is freely movable to the front and back directions with respect to the holder 13. Between the cassette carrier 28 and the front end portion of the cassette holder 13 there are stretched springs 38 to slidably bias the cassette carrier 28 to the front of the cassette holder 13. Further, a carrier lock lever 39 (FIGS. 4, 6 and 7) is pivoted on the shaft 15 to be rotated thereabout. The carrier lock lever 39 has a step portion 40 formed at the lower surface of its tip end portion. Accordingly, when the cassette holder 13 is rotated upwardly as shown in FIG. 8 (which state will be hereinafter referred as an open state) and the cassette carrier 28 is moved back against the spring force of the springs 38, the step portion 40 of the lock lever 39 engages with the window 35 of the cassette carrier 28 at its lower edge to lock the carrier 28 at its backwardly moved position.

In FIG. 6, a spring 41 biases the lock lever 39 to the counter-clockwise direction against a stopper 42 for the lock lever 39. Thus, when the cassette holder 13 is turned from its open state (FIG. 8) to its closed state (FIGS. 6 or 7) the stopper 42 stops the rotation of the lock lever 39 to the counter-clockwise direction immediately before the closed state to release the lock from the cassette carrier 28. Even if the lock action of the lock lever 39 for the cassette carrier 28 is released immediately before the closed state the downwardly depending portions 36 of the cassette carrier 28 are engaged with recesses 43 formed in the base plate 12 with the result that the cassette carrier 28 is still held at its backwardly moved position. In FIG. 6, reference numeral 44 indicates another recess formed in the base plate 12 which acts as a relief for the engaging portion 36 of the cassette carrier 28 when it is not locked at its backwardly moved position, that is to say, it is at the forwardly moved position as shown in FIG. 6. When the holder 13 is subsquently raised to the open position the cassette carrier 28 is biased forward by the springs 38 to eject the cassette 1.

Figure 4:
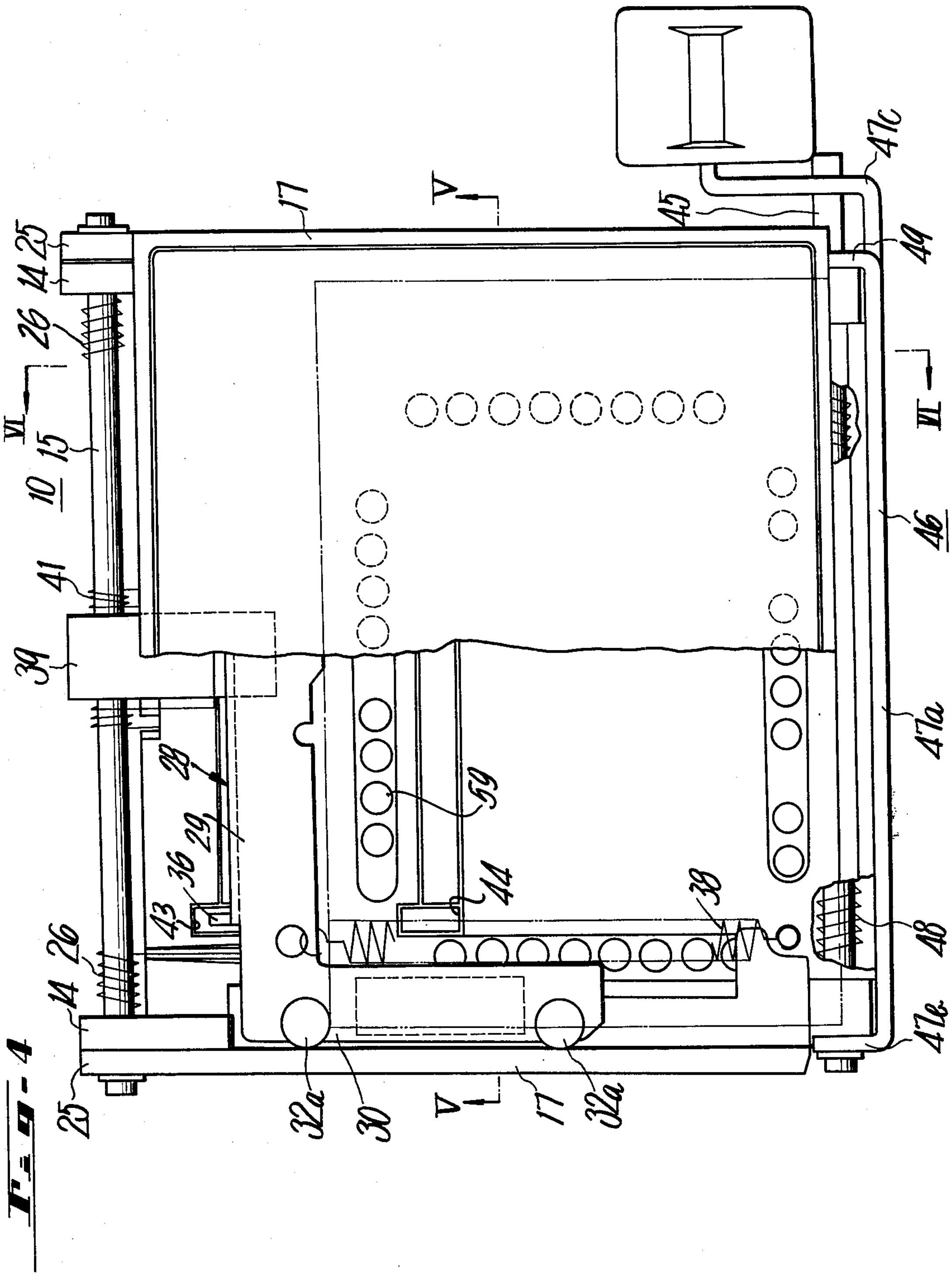
FIG. 4 is a front view partially broken away of a mounting device or holder for the program memory cassette of FIG. 1.

A shaft 45 is attached to the base plate 12 at its front edge and a rotary piece 46 is rotatably supported by the shaft 45. The rotary piece 46 consists of a central piece 47*a* (FIGS. 4 and 8) extending along the front edge of the plate 12 and a pair of left and right side pieces 47*b* and 47*c* both ends of which are bent rearwardly (FIG. 4). These side pieces 47*b* and 47*c* are rotatably mounted to the shaft 45 and the rotary piece 46 is biased to the clockwise direction (as viewed in FIGS. 6 to 8) by a coiled spring 48 (FIG. 4) wound on the shaft 45. A projection 49 is formed on the rotary piece 46 integrally therewith to be protruded rearwardly as shown in FIG. 6. The projection 49 may engage with a projection 50 formed at the front edge of the cassette holder 13 when the latter is at its closed state. The projection 49 has formed thereon an inclined surface 51 which acts to rotate the rotary piece 46 to the counter-clockwise direction (as viewed in FIGS. 6–8) against the spring force of the coiled spring 48 when the cassette holder 13 is rotated to the counter-clockwise direction. The cassette holder 13 is opened by manually rotating the piece 46 and the projection 49 counter-clockwise (as viewed in FIGS. 6–8) to disengage the projection 50.

Figure 10:
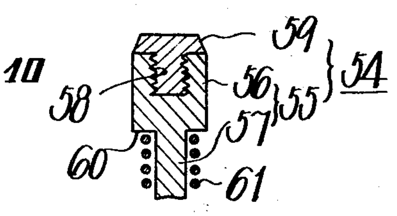
FIG. 10 is a cross-sectional view of a contact device for use in the holder depicted in FIGS. 6–8.

A plurality of bores 52 are formed in the base plate 12 and a plurality of bores 53 are also formed in the printed circuit board 11 in correspondence with the bores 52. A contact device 54 (FIGS. 6 and 10) is mounted through each of the corresponding bores 52 and 53, respectively. As shown in FIG. 10, the contact device includes a contact base piece 55 which consists of cylindrical portions 56 and 57, the former being greater than the latter in diameter. The portion 56 has a recess 58 in its upper surface. The recess 58 has a corrugated surface. An elastic body made of electrically conductive material such as, for example, an electrically conductive elastomer or rubber, is charged in the recess 58 to form a contact portion 59 projecting from the upper surface of the part 56. The elastomer 59 is held within the recess 58 by its corrugated surface. Thus, the contact base piece 55 and the contact portion 59 form the contact device 54.

The contact device 54 thus constructed is biased in an upward direction (in FIGS. 5–8 and 10) by a coiled spring 61 disposed between the printed circuit board 11 and a stepped portion 60 where the portion 57 joins the portion 56 of the contact base piece 55. A flange 62 (FIGS. 6–8) attached to the lower end of the contact device 54 acts as a stopper to contact with the lower surface of the printed circuit board 11 to thereby restrict the movement of the contact device 54 in the upper direction. A plurality of separate lead wires (not shown) are connected between the lower ends of the plurality of contact devices 54 by, for example, soldering and selected portions of the printed circuit board 11 placed near the contact devices 54.

When the cassette 1 is inserted into the open cassette holder 13 (FIG. 8) in such a manner that the cassette housing surface 3 with the arrows 4 is on top and is inserted into the second space 24 of the cassette holder 13 along the arrows 4, the cassette carrier 28 is pushed rearwardly with respect to the cassette holder 13 by the rear edge of the cassette 1 to be locked by the lock lever 39, while the cassette 1 is held by the pairs of resilient pieces 37*a* and 37*b*. At this point, the rear edge of the cassette 1 engages with the abutment 33 of the cassette carrier 28. Thus, the cassette 1 is held firmly in the cassette holder 13.

If the cassette holder 13 is closed at this stage, it is held in the closed state by the rotary piece 46. The contact portion 59 of each of the contact devices 54 is then connected to the corresponding terminals 7 which are exposed outwardly through the bores 6 of the cassette 1. It will be apparent that the respective contact devices 54 are provided in such a position that they correspond to the respective terminals 7 when the cassette holder 13 is in its closed state. Since the conductive elastomer or rubber forming the contact portion 59 is charged in the recess 58 of metal forming the contact base piece 55, the conductive elastomer is firmly connected to the metal. Further, by forming corrugations on the surface of the recess 58, in other words, by roughening the surface of the recess 58, the connection between them is much enhanced.

With the present invention the terminals 7 of the cassette 1 are properly and removably contacted with the contact devices 54 provided in the electronic calculator along the longitudinal direction of the latter without being slidably engaged with each other, so that less trouble due to wearing and the like will occur. Further, with the present invention as the cassette 1 does not slidably contact with a fixed terminal (which is provided on the side of the electronic calculator), no limitation is given on the number of the terminals because the terminals can be provided at any desired positions on the surface 5 of the cassette 1.

In the present invention, since the contact portion 59 is made of conductive elastomer or rubber, the contact is very reliable from electrical and mechanical points of view.

Figure 5:
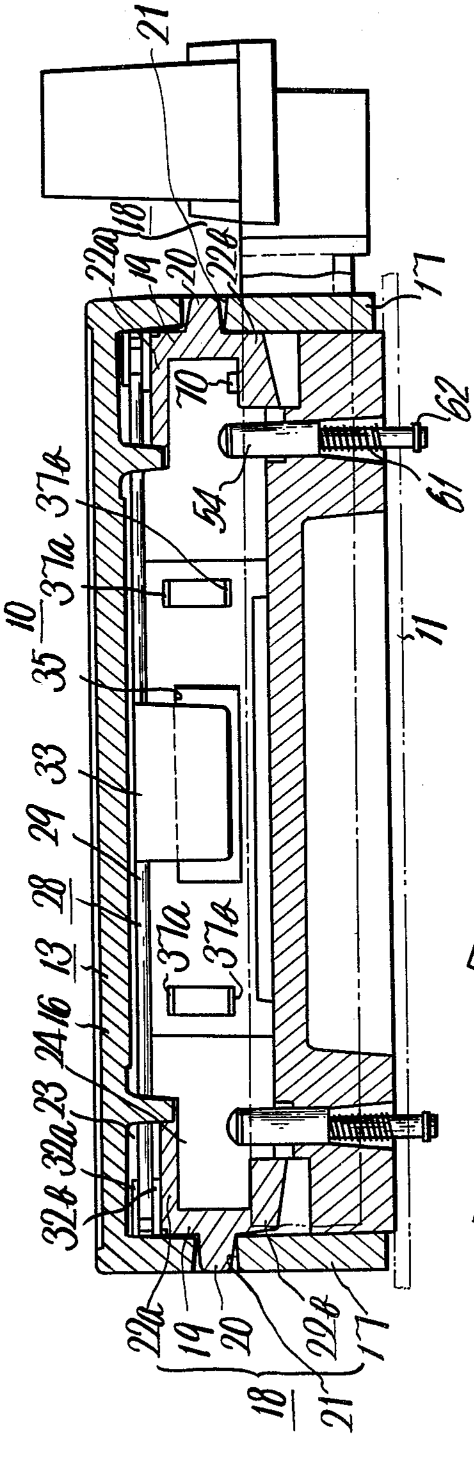
FIG. 5 is a cross-sectional view of the holder taken generally along the line V—V in FIG. 4.

A projection 70 is formed on the rear flange 22*b* disposed in the second space 24 which is positioned on the right hand side in FIG. 5, and when the cassette 1 is properly inserted into the cassette holder 13 in its open state, the groove 9 of the cassette 1 mates with the projection 70, whereas when the cassette 1 is improperly inserted into the cassette holder 13, for example, if it is inserted into the holder 13 upside down, the projection 70 acts to prevent the insertion of the cassette 1 into the holder 13.

Figure 12:
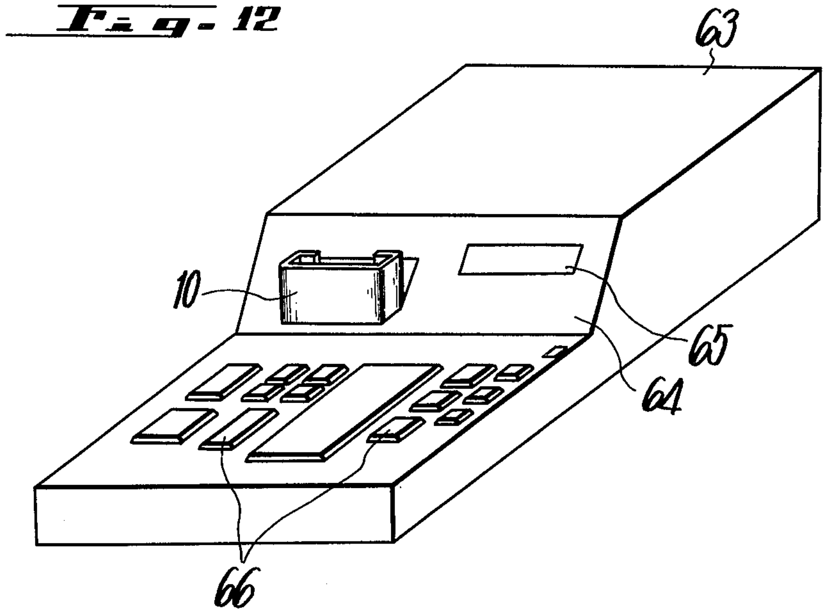
FIG. 12 is a perspective view of an electronic calculator in which the present invention is intended to be used.

FIG. 12 shows a computer, for example, an electronic calculator for which the present invention is adapted. In the figure, reference numeral 63 designates a casing of the electronic calculator which has the mounting device 10 for the cassette 1 mounted on a forwardly inclined surface 64 of the casing 63. The cassette 1 is attached to or detached from the device 10 from above. Reference numeral 65 is an indication of the result of the calculation and 66 designate operation buttons.

With the present invention the memory device, namely the matrix circuit in the example, can be easily attached to or detached from the calculator.

The foregoing description is given with respect to the case in which the present invention is adapted for use with an electronic computer, but it will be apparent that the present invention can be suitably applied to other apparatus with the same effect.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

We claim as our invention:

1. A memory cassette, comprising:

a housing formed of a top wall, a bottom wall and a plurality of side walls joining the top and bottom walls to thereby define a cavity within said housing; and a circuit board disposed within said cavity, said circuit board having memory circuit elements and electric contacts connected to said memory circuit elements;

at least one of said top and bottom walls having differently dimensioned apertures therein aligned with corresponding circuit board electric contacts so that said corresponding circuit board electric contacts are visible through said apertures and said apertures are adapted to receive external electrical connecting means that are insertable therethrough into electric contact with said corresponding circuit board electric contacts.

2. A memory cassette according to claim 1 wherein the memory circuit elements constitute a diode matrix circuit.

3. A memory cassette according to claim 1 wherein the memory circuit elements constitute a resistor matrix circuit.

4. A memory cassette as recited in claim 1, in combination with a program input apparatus comprising a plurality of electric contacts to engage with the corresponding electric contacts of the memory cassette.

5. The combination according to claim 4, wherein the plurality of electric contacts of said program input apparatus are made of elastic conductive material at least at the contact point with the corresponding electric contacts of the memory cassette.

6. A program input apparatus for receiving an electronic memory cassette of the type having a substantially flat housing, electronic circuits within the housing and electrical contacts connected to the electronic circuits and exposed in a pattern on the exterior surface of the cassette housing, the program input apparatus comprising a base plate, a frame pivoted on the base plate and rotatable between an open and a closed position, means within the frame for receiving the cassette including a cassette carrier movably mounted within the frame, and electrical contacts on the base plate arranged in a pattern corresponding to the pattern of the cassette contacts to form electrical connections between the respective base contacts and the corresponding respective cassette contacts when the frame is in its closed position.

7. A program input apparatus as recited in claim 6 wherein the cassette receiving means further includes means for forcibly biasing the cassette carrier when the frame is moved from its closed position to its open position so that the cassette carried by the carrier is positioned at least partially exteriorally of the frame.

8. A program input apparatus as recited in claim 7 wherein the cassette receiving means further comprises means for initially locking the cassette carrier against the force of the biasing means when the frame is moved from its open position to its closed position.

9. A program input apparatus in accordance with claim 6 wherein each of said electrical contacts on the base plate includes a metal body having a cavity at one end and a conductive elastomer filling said cavity and covering the end of the metal body to engage with the corresponding cassette contacts.

10. The combination of claim 9 wherein the circuit electronic elements constitute a diode matrix circuit.

11. The combination of claim 9 wherein the circuit electronic elements constitute a resistor matrix circuit.

* * * * *